(12) United States Patent
Watanabe et al.

(10) Patent No.: US 6,963,672 B1
(45) Date of Patent: Nov. 8, 2005

(54) IMAGE PROCESSING APPARATUS, IMAGE PROCESSING METHOD AND STORAGE MEDIUM

(75) Inventors: Hitoshi Watanabe, Yokohama (JP); Eiji Koga, Kawasaki (JP); Satoshi Ogiwara, Sagamihara (JP); Shinichiro Uno, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/435,352

(22) Filed: Nov. 8, 1999

(30) Foreign Application Priority Data

Nov. 9, 1998 (JP) .................................. 10-318142

(51) Int. Cl.⁷ ............................ G06K 9/60; G06F 17/30
(52) U.S. Cl. ...................................... 382/305; 707/200
(58) Field of Search ............................... 707/200, 502; 356/335, 1.18; 382/284, 305; 386/130; 345/433

(56) References Cited

U.S. PATENT DOCUMENTS

| | | | | |
|---|---|---|---|---|
| 4,888,648 A | * | 12/1989 | Takeuchi et al. | 358/335 |
| 5,287,439 A | | 2/1994 | Koga et al. | 395/133 |
| 5,806,072 A | * | 9/1998 | Kuba et al. | 707/200 |
| 6,111,586 A | * | 8/2000 | Ikeda et al. | 345/433 |
| 6,147,768 A | * | 11/2000 | Norris | 358/1.18 |
| 6,222,947 B1 | * | 4/2001 | Koba | 382/284 |
| 6,237,010 B1 | * | 5/2001 | Hui et al. | 707/502 |
| 6,249,644 B1 | * | 6/2001 | Inoue et al. | 386/130 |

OTHER PUBLICATIONS

Yagawa, Guichi et. Al, "the digital album: A Personal File-tainment system", I.E.E.E., Jun. 1996, pp. 433-439.*

* cited by examiner

*Primary Examiner*—Samir Ahmed
*Assistant Examiner*—Brian Le
(74) *Attorney, Agent, or Firm*—Fitzpatrick, Cella, Harper & Scinto

(57) ABSTRACT

A cell type page which displays a fixed number of images at fixed positions with fixed size on a screen and a free type page which displays equal to or more than one image at arbitrary positions with arbitrary size on the screen are provided. In response to an image insertion order in the cell type page, images belong to the cell type pages behind that cell type page are sent astern without influencing positions of images belong to the free type pages behind that cell type image and blank pages are added if there is no blank cells. In response to an image deletion order from the cell type page, images behind an image to be deleted belong to the cell type pages behind that cell type page are closed ahead without influencing positions of images belong to the free type page behind that cell type page and the blank pages are deleted if the blank pages are appeared.

7 Claims, 9 Drawing Sheets

FIG. 12A

| | |
|---|---|
| PAGE NO. | ~50 |
| THE NUMBER OF ARRANGEABLE IMAGES | ~52 |
| THE NUMBER OF ACTUAL IMAGES | ~54 |
| Pic. No | ~56 |
| PAGE ATTRIBUTE | ~58 |

FIG. 12B

| | |
|---|---|
| IMAGE NO. | ~60 |
| POSITION (x) | ~62 |
| POSITION (y) | ~64 |
| SIZE (x) | ~66 |
| SIZE (y) | ~68 |

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, an image processing method and a storage medium.

2. Related Background Art

A program called an "electronic album" has been known, which runs on an information processing apparatus such as a personal computer or the like. Such sort of program allows for easy insertion, deletion and moving of images in the electronic album, by means of several pocket cells used to paste the images to each page.

In an image pocket cell type page of the electronic album, the size or the position of the pocket cell can be set by selecting from previously prepared patterns, or arbitrarily modified. Its order and position can be managed, in case of an image insertion, by moving one position backward the image which was present at the insertion position and the following images, in case of an image deletion, by erasing the image which was present at the deletion position and moving one position forward the following images.

Also, document creating/editing programs similarly running on the personal computer exist, which allow to paste an image at almost any arbitrary position, furthermore, after pasting, the position and the size of the image can be freely modified. This is so to speak a free image position and size type page and its appearance as a document can be improved by adjusting the position relative to the texts or the figures on the same page.

The image pocket cell type page is easily operated and as it can be regarded as a paper album from the background art which has simply been substituted by an electronic form, is easily understood. On the other hand, the influence of an insertion or a deletion of the image into a certain page extends to the image position in the following pages. For example, if an image is deleted from a page preceding a page completed as a photograph made of three grouped images, one of the grouped images would move to the preceding page and when displayed on a TV or printed on a paper, its consistency as a catalog or grouped photograph is lost.

On another front, the free image position and size type page has a high level of freedom for its appearance as an album page, but leaves a blank space when the image is deleted. In the case the image is inserted, operations such as moving other images are necessary therefore lacks ease of use.

SUMMARY OF THE INVENTION

An object of the present invention is to provide an image managing apparatus and a method, an image processing method and a storage medium which can solve the above-mentioned problem and combine the advantages of both.

A preferred embodiment of the present invention to reach the above-mentioned object is characterized in that an image processing method for laying out images on each of plural pages comprises a first mode of changing image positions of other pages in accordance with a change in a position of an image in a certain page among the above-mentioned plural pages, and a second mode of not changing the image positions of other pages even if the position of the image in a certain page among the above-mentioned plural pages is changed.

The present invention relates to an image processing apparatus having original functions, an image processing method and a storage medium thereof.

Other functions and features of the present invention will be apparent from the following detailed explanation and the attached drawings.

BRIEF DESCRIPTION OF THE DRAWINGS

FIGS. 12A and 12B are figures showing the data structures of an album page and an image;

DETAILED DESCRIPTION OF THE PREFERRED EMBODIMENT

Subsequently, the preferred embodiment of the present invention will be described referring to the attached drawings.

Figure 1:
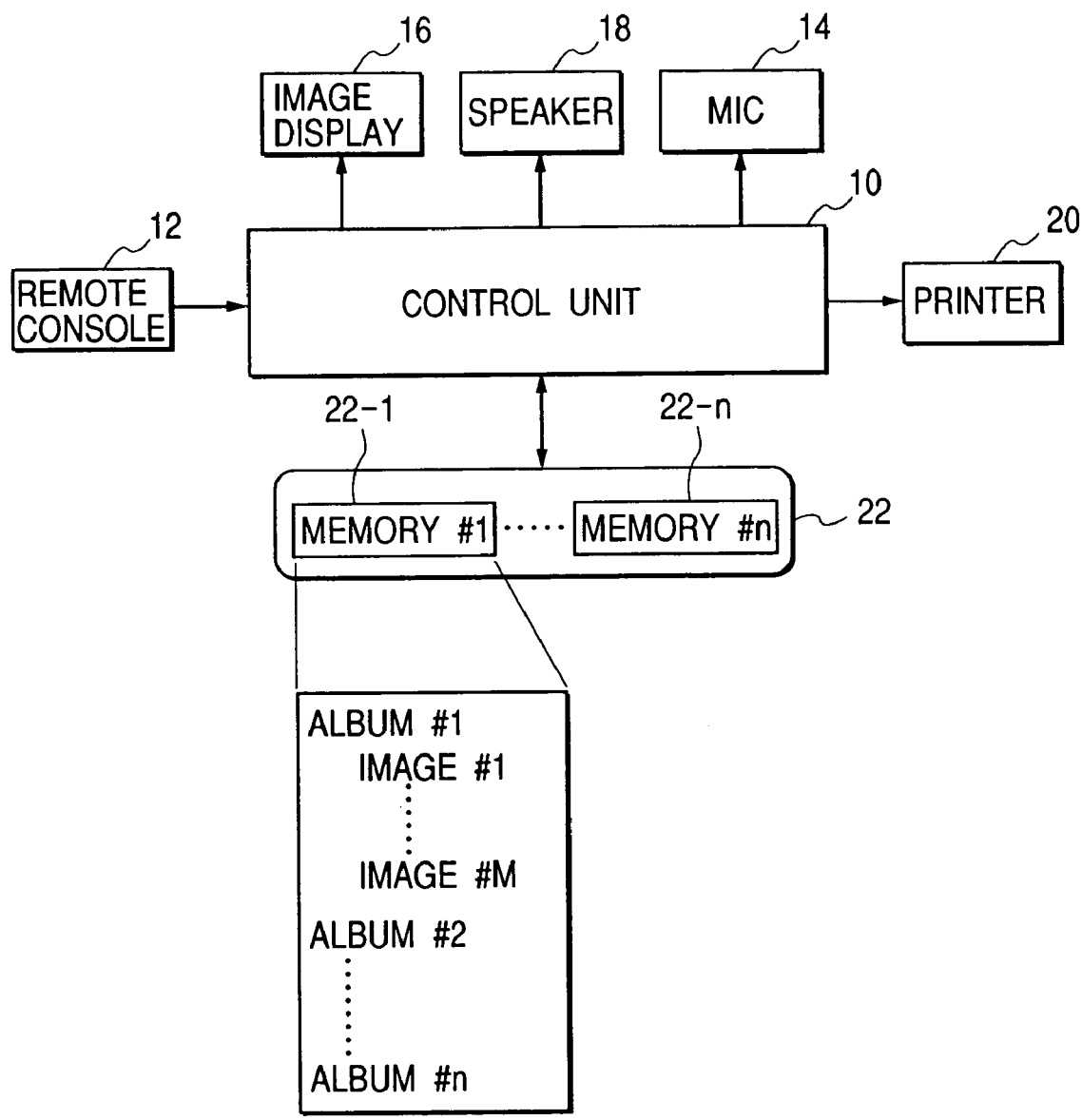
FIG. 1 is a block diagram showing an outline of the structure of an embodiment of the present invention.

FIG. 1 shows an overall structure block diagram of a first embodiment for the present invention. Numeral 10 is a control unit controlling the ensemble, to which input units consisting of a remote console 12 and a microphone (MIC) 14, output units consisting of an image display 16 such as a CRT, a liquid crystal display or the likes, a speaker 18, an inkjet or laser printer 20 and a memory group 22 (including memories 22-1 to 22-n) (G1 to Gn) which store image data, are connected.

The memory group memorizes album page data and image attribute of each image corresponding to images described hereafter (FIGS. 12A and 12B).

It should be noted that the above-mentioned image data is a color image and images displayed on the image display 16 are images which are thinned out, while the printer 20 prints images which are not thinned out.

Consequently, according to a rapid execution of modifications on the image display 16 described hereafter, an image print of high resolution image can be performed.

Figure 2:
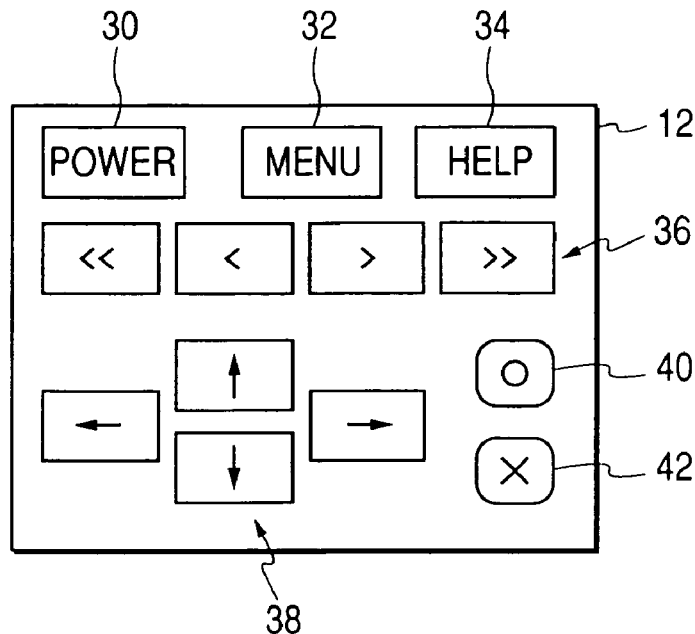
FIG. 2 is an overview of control keys of a remote console 12.

FIG. 2 shows keys on the remote console 12. Numeral 30 is a power key, numeral 32 is a menu key, numeral 34 is a help key, numeral 36 is a page moving key, numeral 38 is an up/down and left/right moving key, numeral 40 is a define/execute key and numeral 42 is an interrupt/cancel key. However, instructions to the control unit 10 can be inputted by a user by suitably selecting function buttons on the image display 16 or the page moving key 36, the up/down and left/right moving key 38 and the define/execute key 40. Such an operating method itself is well known.

Figure 3:
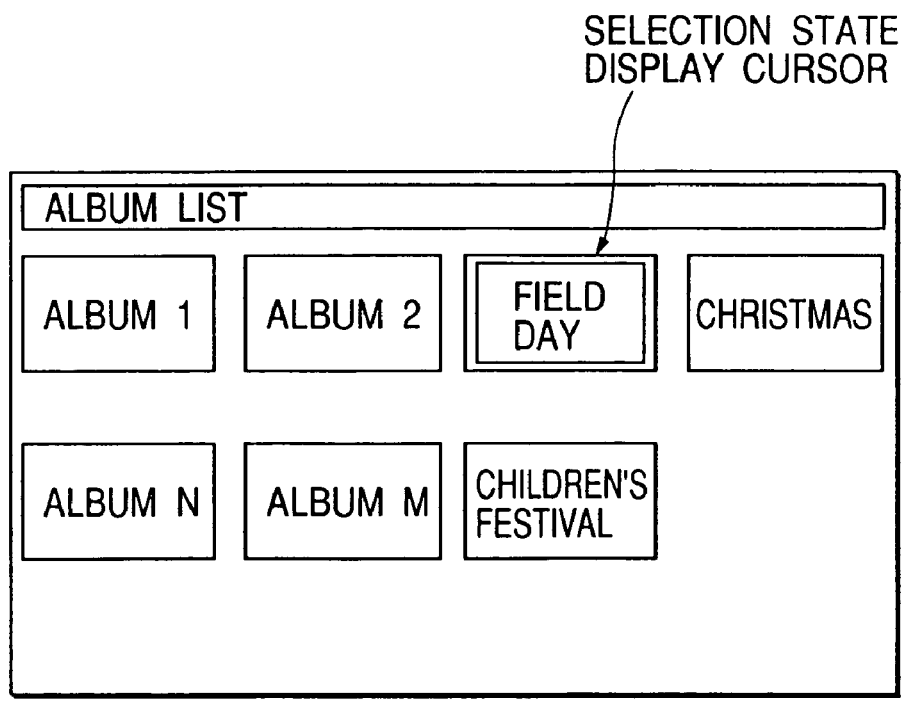
FIG. 3 is a view showing an example of displaying an album list.

The present apparatus starts an operation when the power key 30 of the control unit 10 or the remote console 12 is pressed, or when a storage medium is loaded into the memory group 22. After it starts, under a control of the control unit 10, a summary of an electronic album memorized in the memory group 22 is displayed on a screen of the image display 16 as shown in FIG. 3. Any one among several albums can be selected by the up/down and left/right moving key 38 and the define/execute key 40.

Figure 4:
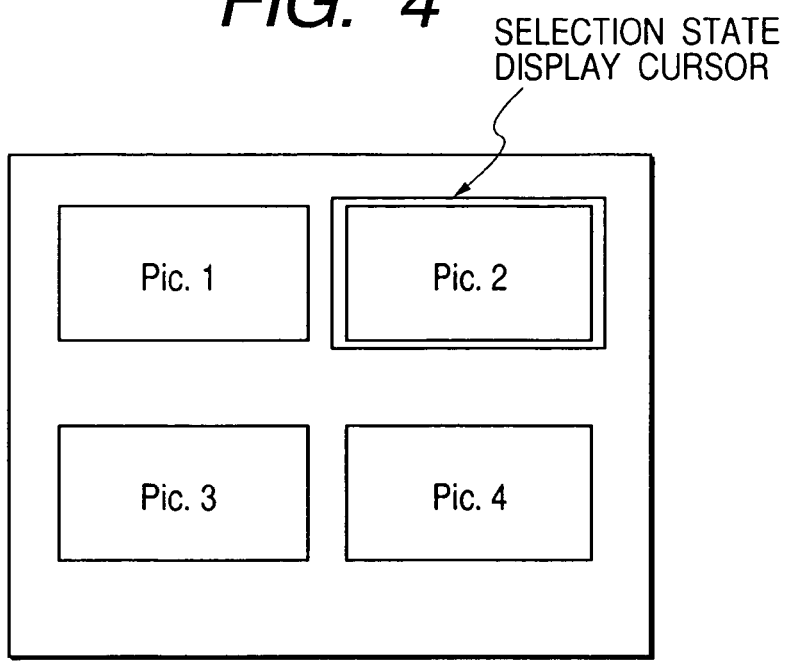
FIG. 4 is a schematic view of a screen when images contained in one album are displayed on a page.

When one album is selected, a first page of the selected album is displayed as shown in FIG. 4. FIG. 4 exemplifies a pattern #3 (form which displays a set of four images, two by two, in up/down and left/right positions) of an image pocket cell type page. In FIG. 4, four images Pic. 1 to Pic. 4 are displayed with the same size on one page. Several images are recorded in each album and each image is numbered sequentially for each album. As in the album summary shown in FIG. 3, in a page display shown in FIG. 4, a selection status indicating cursor is always associated with at least one image. The up/down and left/right moving key 38 allows to move the selection status indicating cursor on another image on the screen.

The insertion and deletion of images in the image pocket cell type page will be described briefly. In addition, the following operation can be realized by an operator issuing instructions using the remote console 12.

Figure 5:
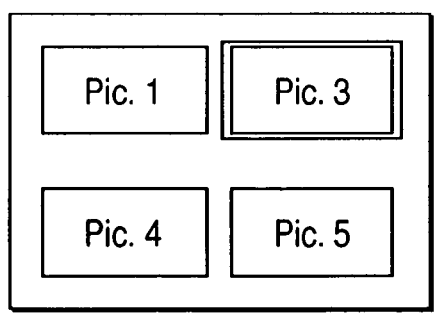
FIG. 5 is a schematic view of a screen resulting from the deletion of an image from an image pocket cell type page shown in FIG. 4.

In FIG. 4, four images Pic. 1 to Pic. 4 are displayed on one page and the selection status indicating cursor is associated with the image Pic. 2. From this status, if an image deletion is performed, the image Pic. 2 is deleted and the screen becomes as shown in FIG. 5. In other words, a next image Pic. 3 moves to a position where the image Pic. 2 was, an image Pic. 5 moves to a position where the image Pic. 4 was, such that sequential images are successively closed forward (ahead). The order of the images contained in the current or subsequent pages does not change, the images following the deleted images are closed ahead and displayed.

Figure 6:
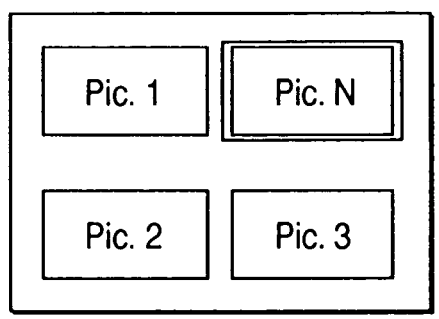
FIG. 6 is a schematic view of a screen resulting from the insertion of the image into the image pocket cell type page shown in FIG. 4.

From a status as shown in FIG. 4, if an image insertion instruction of an image Pic. N is performed, the image Pic. N is inserted at the position where the image Pic. 2 was, the image Pic. 2 is moved to the position of the image Pic. 3 and images subsequent to the image Pic. 3 move successively backward (astern), as shown in FIG. 6.

Thus, in the image pocket cell type page, the images are placed in each page pocket cell following the order recorded in the album, in case the deletion or the insertion of the image is performed, the images after the position where the insertion or the deletion occurred are sequentially closed ahead or sent astern. Thus, the image pocket cell type page allows an easy execution of deletion and insertion of the images, and the order of the images can easily be changed. The images are always supplied continuously without leaving a blank space in the album page.

The image pocket cell type page has the above-mentioned advantages, but on the other hand, there are some disadvantages. That is, the position of the image is changed synchronizing with the deletion or the insertion of the image.

For example, considering a photograph composed of a single group of several images and that all of the grouped photograph is placed to be contained in some page of the album. From this situation, if one image positioned before the page containing the grouped photograph is deleted, in the case of the image pocket cell type page, since the images positioned after the deleted image are successively closed ahead, only one of the grouped photographs moves forward. As a result, the grouped photograph collapses.

In order not to collapse the grouped photograph, a free image position and size type page (simply referred to "FREE PAGE" in the drawings) can be used. The influence of the deletion and the insertion for the free image position and size type page and the previous image pocket cell type page will be explained.

Figure 7:
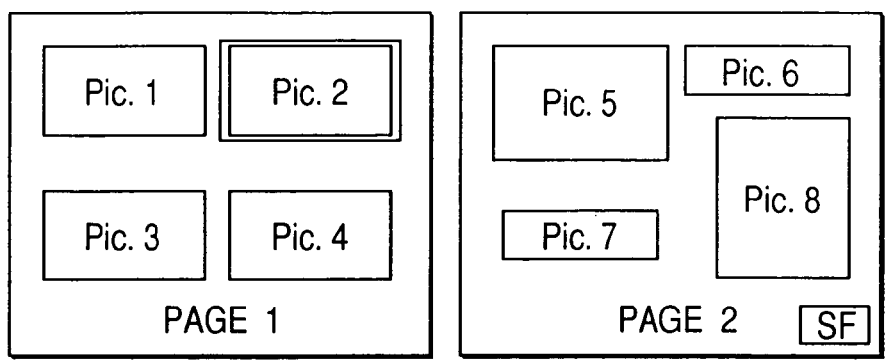
FIG. 7 is a schematic view of the image pocket cell type page and a free image position and size type page.

FIG. 7 shows a display state on the image display 16 of a first page and a second page of some album. The first page is the image pocket cell type page, but the second page is the free image position and size type page. The "SF" displayed at the bottom right shows that the page is the free image position and size type page.

Figure 8:
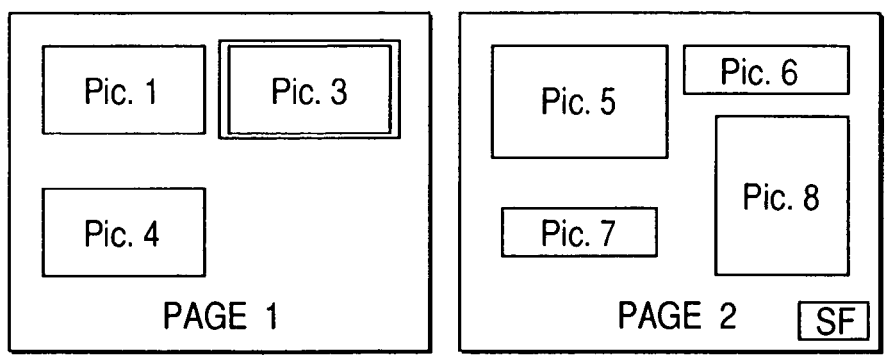
FIG. 8 is a schematic view of a result of the deletion of an image Pic. 2 from a first page (Page 1) shown in FIG. 7.

Consider that the deletion instruction of the image Pic. 2 from the first page shown in FIG. 7 is executed. If the second page is the image pocket cell type page, as explained using FIG. 5, the following images are successively being sent to the position where the deleted image was placed, but in FIG. 7, since the second page is the free image position and size type page, images Pic. 5, Pic 6, Pic 7 and Pic. 8 placed on the second page remain on the second page with the same position and size, while the image Pic. 2 is deleted from the first page, and the following images Pic. 3 and Pic. 4 in the first page are closed ahead. The final result is shown in FIG. 8. As the closing ahead occurs in the first page, the next image Pic. 4 is placed in the cell where the image Pic. 3 was in FIG. 7, but the cell where the image Pic. 4 was becomes a blank cell. This is because the next image Pic. 5 belongs to the free image position and size type page and thus does not move to the preceding page. As a result, even if the image pocket cell type pages were present after a third page, the moving of the images is blocked at the second page, and there is no influence of the execution of the image deletion at the first page, to the pages after the second page.

From the display status shown in FIG. 8, in the case the cursor is adjusted to the image Pic. 3 and an image insertion order is executed, a new image Pic. N1 is placed in the cell where the image Pic. 3 was. The images following the image Pic. 3 are sent successively astern, but as there is one blank cell in the first page, the image Pic. 4 is moved to the blank cell as shown in FIG. 9.

Figure 9:
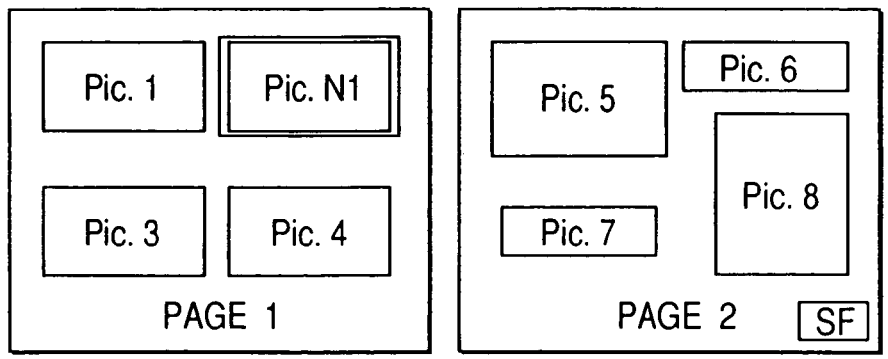
FIG. 9 is a schematic view of a result of the execution of an image insertion order while a cursor is adjusted to an image Pic. 3 in the status shown in FIG. 8.

From the display status shown in FIG. 9, in the case in which another insertion order is executed at the position of the image Pic. N1, a new image Pic. N2 is placed in the cell where the image Pic. N1 is positioned, the images Pic. N1, Pic. 3 and Pic. 4 from the first page are sent astern one by one. As the first page has only four cells, the image Pic. 4 cannot fit into the first page and is sent to the second page. However, since the second page is the free image position and size type page, the member-position-size of images which belong to the second page cannot be influenced by any order from other pages. Therefore, in order to place the image Pic. 4 overflown from the first page, the pages after the second page are sent astern as a whole page without changing the position-order-size of the images. That is, newly insert a blank second page after the first page, and the already existing second page, the third page and the following pages are renumbered to become the third page, the fourth page, and the following pages. Then, the image Pic. 4 is placed in the first cell of the blank second page. The result is shown in FIG. 10.

The moving of images from the free image position and size type page to the image pocket cell type page will be explained. From the display status shown in FIG. 10, in the case an image Pic. 7 is to be moved from the third page to the second page, the cursor is first adjusted to the image Pic. 7 and an image moving order is executed. Then, as a guidance displaying is performed to assign a moving destination, the second page is assigned. Then, the image Pic. 7 is moved from the third page to the second page and placed as shown in FIG. 11. Since the third page is the free image position and size type page, other images are not influenced by the removal of the image Pic. 7 from the page. Since the blank cell is present in the second page which is the moving destination of the image Pic. 7, the image Pic. 7 is placed to its blank second cell.

Figure 10:
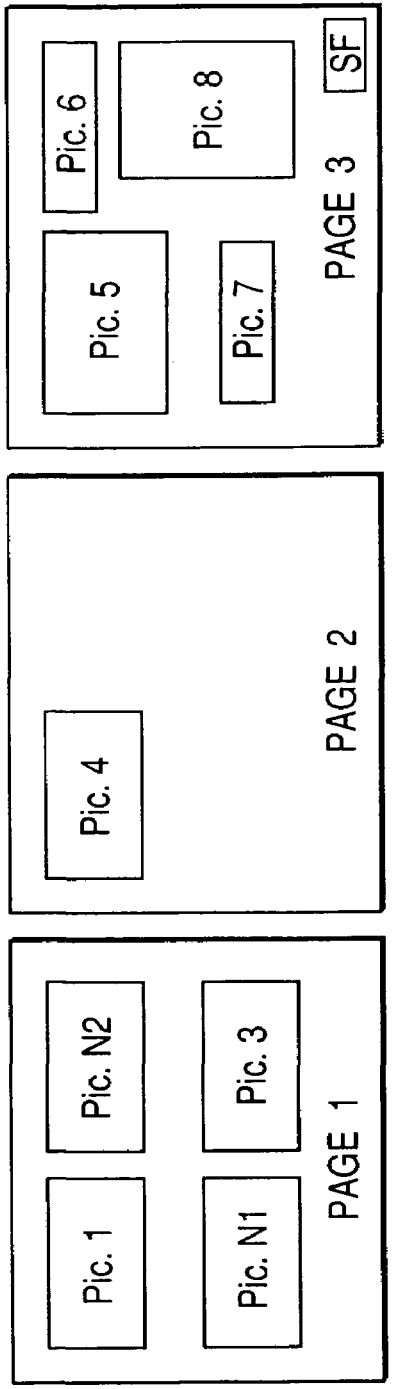
FIG. 10 is a schematic view of a result of the execution of a further image insertion order to the position of an image Pic. N1 from the status shown in FIG. 9.
Figure 11:
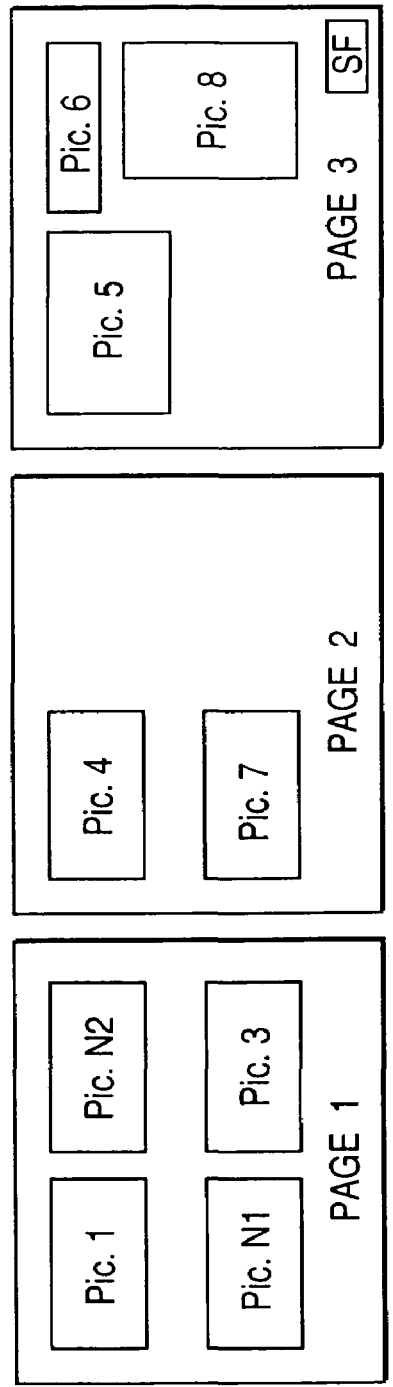
FIG. 11 is a schematic view of a result when an image Pic. 7 in a third page (Page 3) shown in FIG. 10 is moved to a second page (Page 2)

As in the display status shown in FIG. 10, the image Pic. 7 has a horizontally long rectangle shape in the third page, but as the second page is the image pocket cell type page, the number of cells, the size and the shape are predefined. Therefore, the image Pic. 7, at the point it is placed on the second page, takes the same size and shape as those of the image Pic. 4 and the likes, instead of the horizontally long rectangle shape as in the third page.

The album page data is maintained as an album structure (page display control information) which consists in five elements as shown in FIG. 12A. One page is represented by the one album structure and the album structures corresponding to the page number are maintained as a sequence in a whole album. Element 50 is a page number and indicates to which page number the data belongs. Element 52 indicates how many images can be placed on the page. Element 54 indicates how many images are actually placed on the page. In other words, the difference between the element 52 and the element 54 indicates the number of blank cells on the page. The latest number of the image placed on the page, that is the image number is stored in element 56. The image numbers are a series of successive numbers within the album. On the page, images are to be placed starting with a number indicated by the element 56 and for a continuous number indicated by the element 54. Element 58 indicates an attribute of the page. The page attribute is either the image pocket cell type or the free image position and size type. The page attribute determines the behavior of the image when the deletion or the insertion is executed.

The attribute of each image is maintained by an image structure (image display control information) shown in FIG. 12B. The images which belong to the album have one image structure per one image and a whole image part is maintained as a sequence. Element 60 indicates an image number. The image numbers are series of successive numbers and obviously unique to each image within the album. Element 62 indicates the x coordinate of an upper left point of the image in the free image position and size type page. Element 64 indicates the y coordinate of the upper left point of the image in the free image position and size type page. Element 66 indicates a dimension of the image in the x direction and element 68 indicates a dimension of the image in the y direction respectively. However, the elements 60 to 68 bear these meanings only in the case when the attribute of the page to which the image belongs indicates the free image position and size type. This is because in the case of the image pocket cell type page, the position and the size of the images are predefined as the position and the size of the cells.

Figure 13:
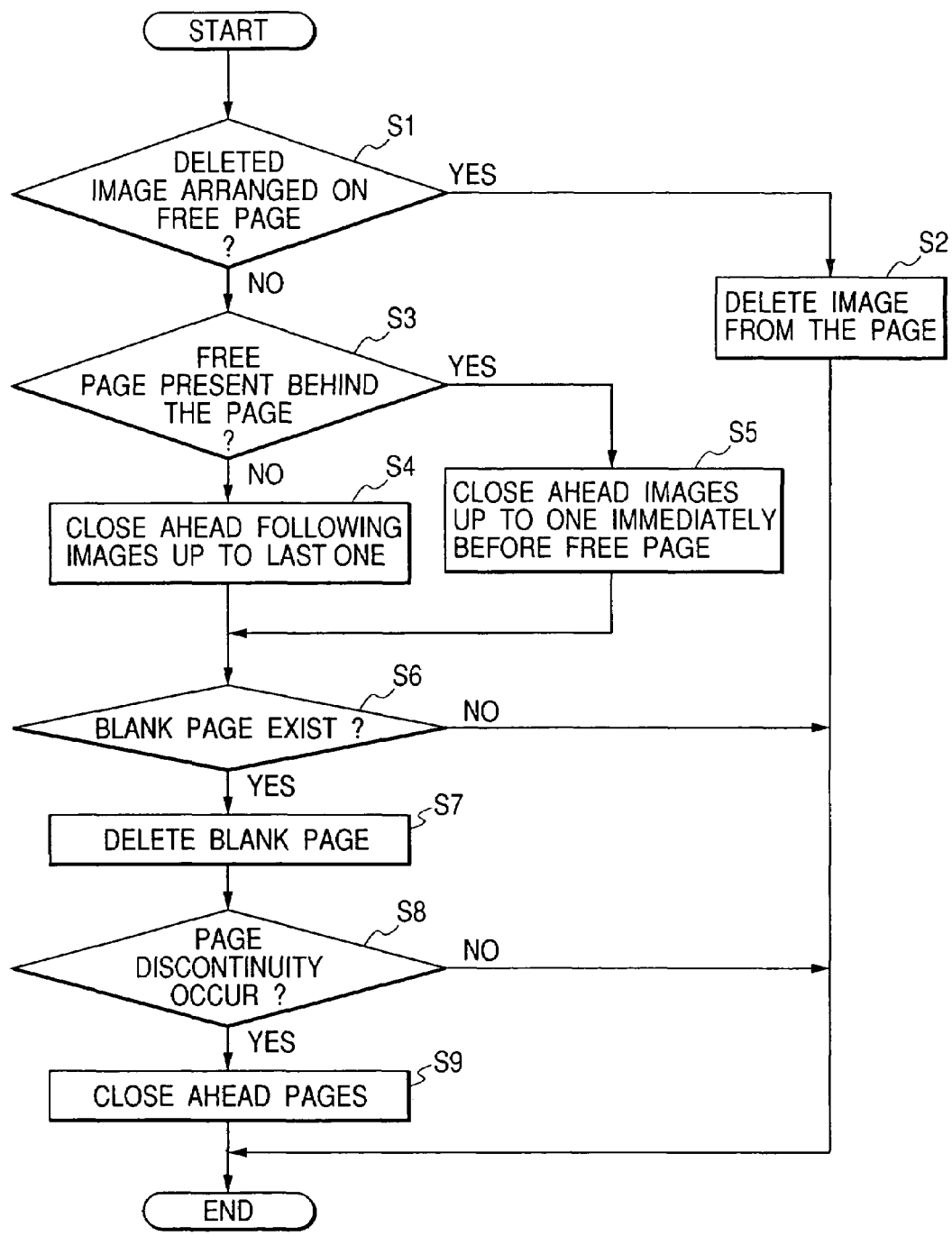
FIG. 13 is a flow chart of processing when a certain image is deleted from the album page.

A flow of process when some image is deleted from the album page will be explained. In addition, the following process is executed by the control unit 10 according to the program stored in a RAM or a ROM (not shown) in the control unit 10. FIG. 13 is a flow chart of it. According to the page attribute 58, it is judged which of the image pocket cell type page or the free image position and size type page the deleted page was placed on (S1). If it is the free image position and size type page, the assigned image is only to be deleted from the page, and there is no influence on other pages (S2).

If it is the image pocket cell type page determined in S1, look up whether there is the free image position and size type page behind the page containing the image (S3). If there is no free image position and size type page (S3), close ahead all the images following the deleted image (S4). If there is the free image position and size type page in step S3, close ahead the images up to the page immediately before the detected free image position and size type page (S5). There is no influence of the image deletion on the pages behind the detected free image position and size type page.

In step S6, it is checked whether or not a blank page containing not a single image has been created as the result of either S4 or S5. This is because if, from a status where the image pocket cell type page with only a single image is immediately before the free image position and size type page, and an image preceding it is deleted, a blank page will be created. If the blank page is created, the blank page is deleted in step (S7).

In step S8, it is checked whether there is page continuity. This is because if the blank page is the last page, even if the page is deleted, the continuity will be conserved, but if the blank page immediately before the free image position and size type page is deleted, the page number will be skipped by one.

When the discontinuity of the pages is detected in step S8, in order to become continuous, the pages are closed ahead in step S9, which ends an image deletion process.

Figure 14:
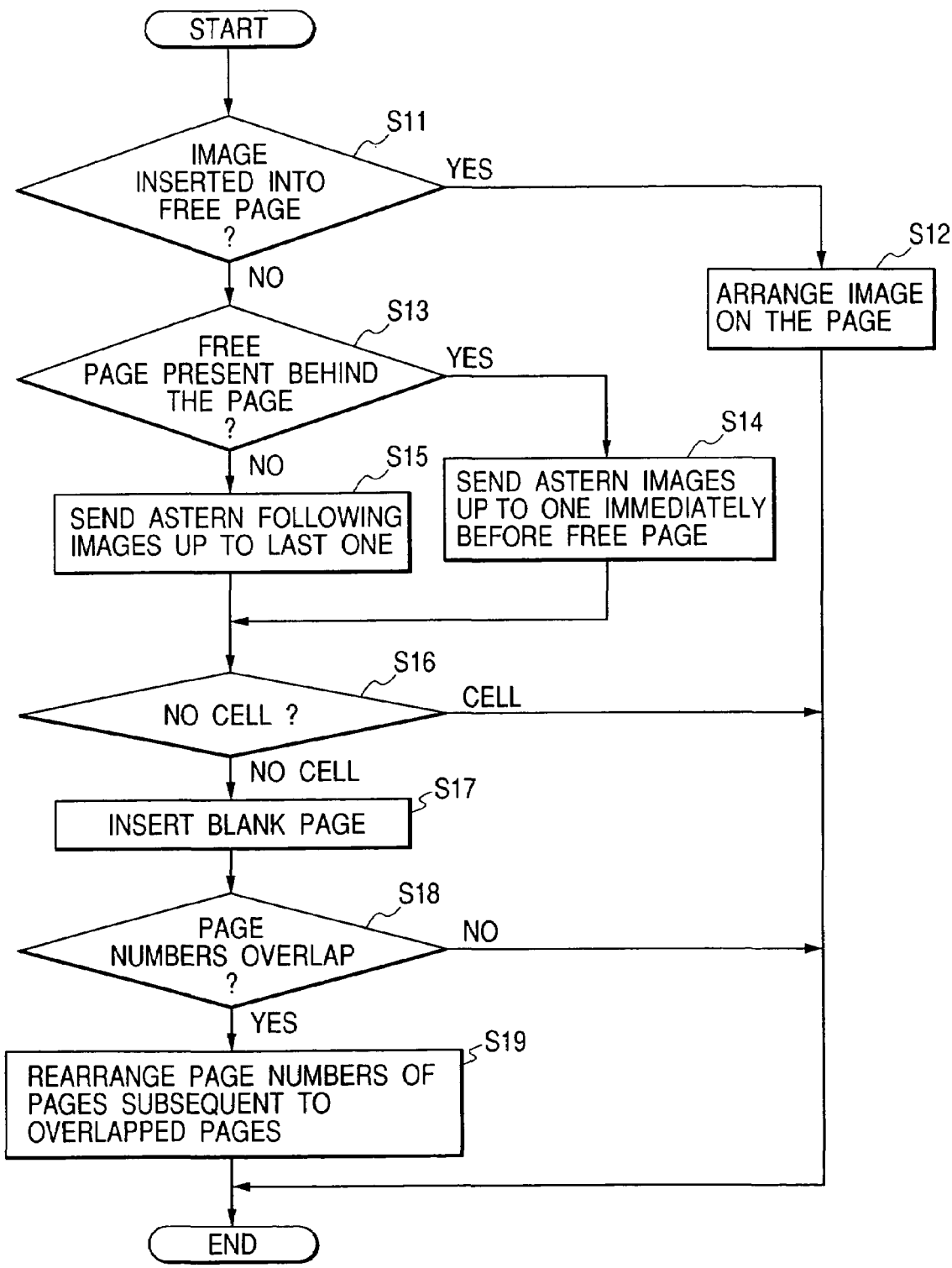
FIG. 14 is a flow chart of processing when a certain image is inserted into the album page.

In the following, the process flow when some image is inserted to the album page will be explained. In addition, the following process is also executed by the control unit 10 according to the program stored in a RAM or ROM (not shown) in the control unit 10. FIG. 14 is a flow chart of it. According to the page attribute 58, it is judged in step S11 which of the image pocket cell type page or the free image position and size type page the inserted page was placed on. If it is the free image position and size type page determined in step S11, the process is terminated by newly placing an image on the page (S12). There is no influence on other pages.

If, in step S11, it is determined that the page where the image insertion was performed is the image pocket cell type S11, in step S13, it is looked up whether there is the free image position and size type page behind the page containing the image. If, in step S13, it is determined that there is no free image position and size type page behind, the images placed on cells following the cell where the insertion was performed are successively sent astern in step S15. If, in step S13, it is determined that there is the free image position and size type page behind, the images from the position where the insertion occurred, up to the page immediately before the detected free image position and size type page, are successively sent astern in step S14.

When successively sending astern the images, the last image among the sent images is to be placed on a new cell. Thus, step S16 judges whether there is a blank cell. If there is no blank cell, in the case in which the free image position and size type page has been detected in the step S13, a blank page is inserted immediately before the page. If the free image position and size type page has not been detected in step S13, the blank page is inserted (added) at the end of the album in step S17. If the insertion of the blank page (S17) is not an addition to the end of the album, the number of the blank page and the number of the already existing page will overlap. Therefore, this is checked in step S18. If the page numbers overlap, the page numbers of the pages subsequent to the overlapped already existing page are rearranged in step S19. This ends the image insertion process.

Figure 15:
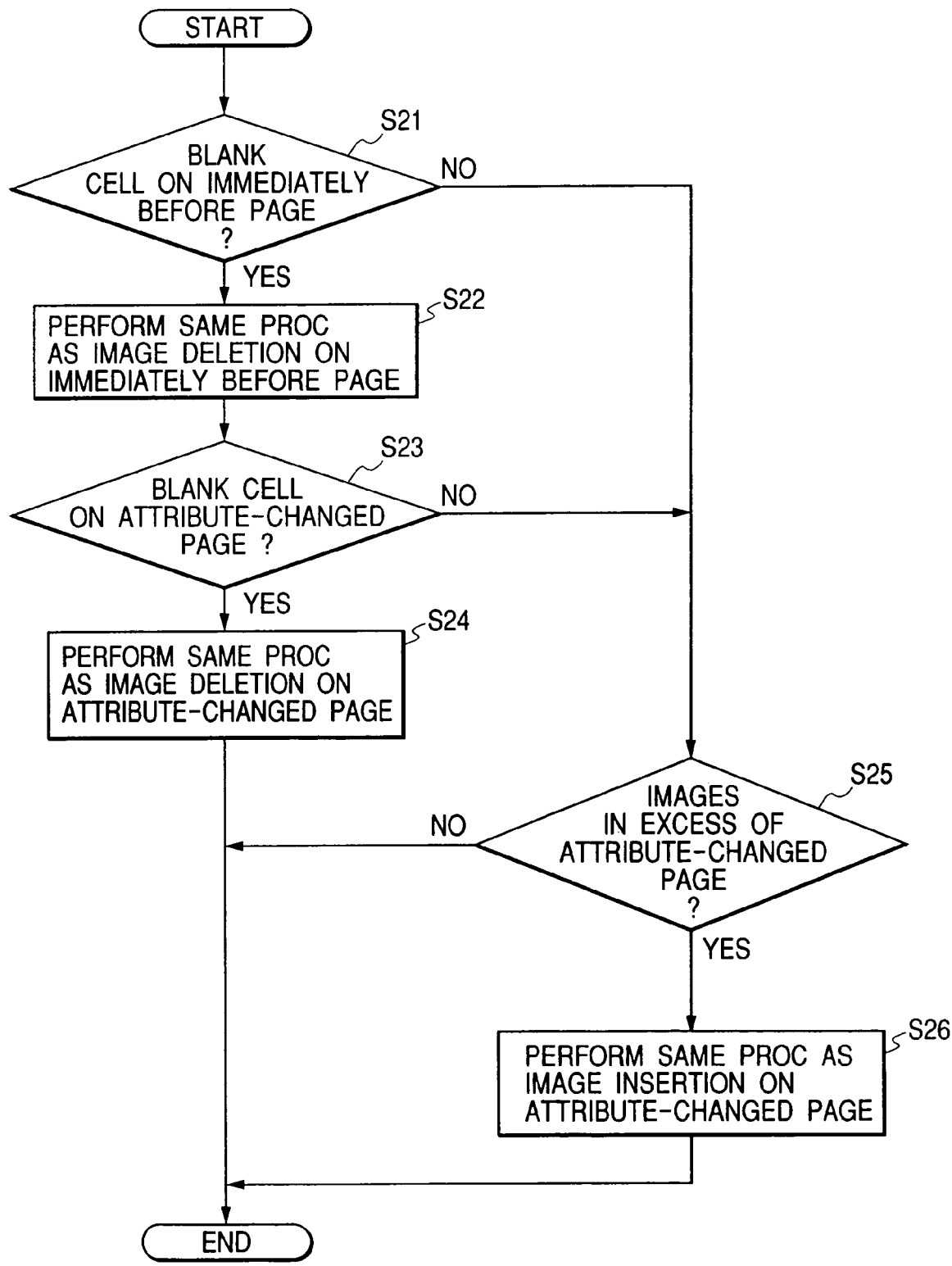
FIG. 15 is a flow chart showing the processing and operation when the attribute of a page is modified while the album page is displayed.

The process and the operation for changing the attribute of a page while displaying the album page will be explained. FIG. 15 is a flow chart of it. In addition, in the case the image pocket cell type page is converted to the free image position and size type page, since only the attribute of the assigned page is changed and only the indicator "SF" appears at the bottom right on the display as shown in the second page of FIG. 7, a detailed explanation will be omitted.

In the case the free image position and size type page is converted to the image pocket cell type page, if the immediately before page is the image pocket cell type page, moreover, if there are blank cells in the image pocket cell type page, the images flow from the page which is converted to the image pocket cell type page from the free image position and size type page so as to fill the blank cells. As a result of the images flowing to fill the blank cells, by comparing the number of the predetermined number of cells and the number of remaining images of the page for which the attribute has been changed, if there are more images, the exceeding images also flow astern. If there are more cells, the images flow from the behind pages. In other words, when the free image position and size type page is converted to the image pocket cell type page, the moving of images occurs filling upstream blank cells, in order to match the number of images and the number of cells in the page which has newly become of image pocket cell type. This moving is equivalent to the moving which is a combination of several deletions of images and several insertions of images.

The explanation will be given concretely using FIG. 15. In step S21, it is judged whether the page immediately before the page which attribute has been changed to the image pocket cell type page is the image pocket cell type, moreover, whether it has the blank cells. If there are the blank cells, a process identical to when the images have been deleted for the number of the blank cells in the immediately before page is executed in step S22. That is, the images flow from the attribute-changed page to the immediately before page. In step S23, it is judged whether the blank cells are created in the page by the flowing of the images from the attribute-changed page. If the blank cells are judged to be created in step S23, a process identical to when the image deletion process is performed on the page (process shown in FIG. 13, step S3 onwards) is executed in step S24. If there are no blanks on the page immediately before the attribute-changed page (S21), and if there are no blank cells on the attribute-changed page (S23), it is judged whether the number of the images are greater than the number of the cells on the attribute-changed page in step S25. In the case in which there are more images than the cells, execute a process identical to when the image insertion process is performed on the page (process shown in FIG. 14, step S13 onwards) is executed in step S26.

Thus, the process in the case the attribute of the page is changed from the free image position and size type to the image pocket cell type while displaying the album page ends.

As explained above, by adding either of the free image position and size type attribute or the image pocket cell type attribute to the album page and by the proper use according to the aim, a user designed composed album can easily be realized.

In the above-mentioned embodiment, the structure is such that, if the images are deleted/inserted from/in the image pocket cell type page before the free image position and size type page, as shown in FIGS. 8 and 10, the blank cells appear in the page immediately before the free image position and size type page. However, it is possible to move the images which belong to the image pocket cell type page immediately behind the free image position and size type page, by the same number as the blank cells, to a blank image pocket cell type page beyond the free image position and size type page, and fill the blank cells. That is, the images which belong to the image pocket cell type behind can be closed ahead. According to the preference of a user, a choice of the behavior can be predetermined, or when the blank cells appear, an inquiring guidance is to be displayed on the image display 16 and by the user assignment using the remote control unit 12, the blank cells can be filled automatically.

It is evident that, although in the present embodiment, the electronic album apparatus is explained, it is not always limited to the electronic album apparatus, and can be adapted, for example, to an electronic album performing identically to the above-mentioned embodiment as an application program running on a personal computer.

The present invention can be adapted to a system composed of several devices, or adapted to an apparatus composed of one device.

Moreover, the embodiment may be achieved in the cases where the program code of the software for realizing functions in the above-mentioned embodiment is supplied to either an apparatus or a computer in a system connected to various devices which are to be operated so as to realize the functions in the above-mentioned embodiment and the apparatus or the computer (or CPU or MPU) of the system operates the above-mentioned various devices in accordance with the stored program.

In this case, a program code itself of the above-mentioned software is to realize the functions of the above-mentioned embodiment and the program code itself and means for providing the program code to the computer, for example, a storage medium which stored the program code are to constitute the current embodiment. As the storage media to store the program code, for example, floppy disks, hard disks, optical disks, magneto-optical disks, CD-ROM's, magnetic tapes, non-volatile memory cards, ROM and the like can be used.

Also, it is evident that the program code is included in the embodiment of the present invention in the cases where not only the functions in the above-mentioned embodiment can be realized by executing the provided program code with the computer, but also the functions in the above-mentioned embodiment can be realized by the cooperative operating of the program code with an OS (operating system) running on the computer or other application software.

Further, it is evident that a case of realizing the functions of the above-mentioned embodiment is included in the embodiment of the present invention by the process that the supplied program code is stored in a memory equipping an extension board of the computer or equipping a function extension unit connected to the computer, thereafter, the CPU or the like equipping the extension board or the function extension unit performs a part of, or all of an actual process based on instructions from the program code.

As it can be easily seen from the above description, in the case a group of images recorded on a storage medium such as the hard disk or the like is to be displayed on a display apparatus such as a TV or the like with a page unit, while conserving the ease of editing work such as moving, adding and deleting each image, the images can be flexibly placed on the page.

What is claimed is:

1. An image processing method for managing and controlling, on a per page basis, plural images stored in a storage means, said method comprising:
    a page attribute judgment step, of judging whether a page is either an image cell type page in which a number and size of included images on the page are defined or a free image positioned and sized page in which the number and the size of the included images on the page may be flexibly changed;
    a page display step, of displaying plural images stored in the storage means by distributing the images to each page in accordance with a judgment result obtained in said page attribute judgment step;
    an insertion and rearrangement step, of, in response to an image insertion command in an image cell type page, moving images belonging to the image cell type page back behind an inserted image without influencing positions of images belonging to free image positioned and sized pages located behind the image cell type page with the inserted image and adding additional pages if no blank cells exist; and
    a deletion and rearrangement step, of, in response to an image deletion command in an image cell type page, moving images belonging to the image cell type page forward, which were located behind a deleted image, without influencing the positions of the images belonging to the free image positioned and sized pages located behind the image cell type page with the deleted image and deleting blank pages if blank pages appear.

2. A method according to claim 1, wherein,
    in said insertion and rearrangement step, in response to the image insertion command in the image cell type page, images belonging to successive image cell type pages located behind the image cell type page with the inserted image are moved back, and additional pages are added if no blank cells exist, and
    in said deletion and rearrangement step, in response to the image deletion command in the image cell type page, images belonging to successive image cell type pages located behind the deleted image are moved forward, and blank pages are deleted if blank pages appear.

3. A method according to claim 1, further comprising an attribute changing and rearrangement step, of rearranging the images, which belong to a series of image cell type pages that include pages of which display attributes are changed, on each page in the series of the image cell type pages, in response to a change in a display attribute from a free image positioned and sized page to an image cell type page.

4. A method according to claim 3, wherein said attribute changing and rearrangement step further includes rearranging the images belonging to all the image cell type pages on each image cell type page, in response to the change in the display attribute from the free image positioned and sized page to the image cell type page.

5. A method according to claim 1, wherein an aspect ratio of the color image may be changed in free image positioned and sized pages.

6. A method according to claim 1, wherein each page has page display control information which includes data for defining a page number, a maximum number of images, a number of included images and the included images, and each information of the display attribute.

7. A method according to claim 1, wherein each image has image display control information which includes an image number managed by a display order management means, coordinate data indicating a display position in a case of free image positioned and sized pages, and display size data.

\* \* \* \* \*

UNITED STATES PATENT AND TRADEMARK OFFICE
CERTIFICATE OF CORRECTION

| | |
|---|---|
| PATENT NO. | : 6,963,672 B1 |
| APPLICATION NO. | : 09/435352 |
| DATED | : November 8, 2005 |
| INVENTOR(S) | : Watanabe et al. |

It is certified that error appears in the above-identified patent and that said Letters Patent is hereby corrected as shown below:

Title Page
(57) In the Abstract:
    Line 6, "belong" should read --belonging--;
    Line 9, "is" should read --are--;
    Line 11, "belong" should read --belonging--; and
    Line 13, "belong" should read --belonging--.

COLUMN 1:
    Line 25, "in" should read --and in--; and
    Line 51, "necessary therefore lacks" should read --necessary, therefore lacking in--.

COLUMN 2:
    Line 61, "likes," should read --like,--.

COLUMN 4:
    Line 8, "considering" should read --consider--; and
    Line 9, "and that" should read --wherein--.

COLUMN 5:
    Line 1, "overflown" should read --that has overflowed--;
    Line 4, "newly insert" should read --after the insertion--; and
    Line 31, "likes," should read --like,--.

COLUMN 6:
    Line 19, "look" should read --it is looked--.

UNITED STATES PATENT AND TRADEMARK OFFICE
CERTIFICATE OF CORRECTION

PATENT NO. : 6,963,672 B1
APPLICATION NO. : 09/435352
DATED : November 8, 2005
INVENTOR(S) : Watanabe et al.

It is certified that error appears in the above-identified patent and that said Letters Patent is hereby corrected as shown below:

COLUMN 7:
      Line 29, "moreover, if" should read --and if--;
      Line 49, "which" should read --whose--; and
      Line 67, "execute a process" should read --a process is executed that is--.

Signed and Sealed this

Fifteenth Day of April, 2008

JON W. DUDAS
*Director of the United States Patent and Trademark Office*